(12) United States Patent
Hjelmgaard

(10) Patent No.: US 12,398,070 B2
(45) Date of Patent: Aug. 26, 2025

(54) MINERAL WOOL BINDER

(71) Applicant: ROCKWOOL INTERNATIONAL A/S, Hedehusene (DK)

(72) Inventor: Thomas Hjelmgaard, Fredensborg (DK)

(73) Assignee: ROCKWOOL A/S, Hedehusene (DK)

( * ) Notice: Subject to any disclaimer, the term of this patent is extended or adjusted under 35 U.S.C. 154(b) by 661 days.

(21) Appl. No.: 17/635,451

(22) PCT Filed: Aug. 14, 2020

(86) PCT No.: PCT/EP2020/072917
§ 371 (c)(1),
(2) Date: Feb. 15, 2022

(87) PCT Pub. No.: WO2021/032645
PCT Pub. Date: Feb. 25, 2021

(65) Prior Publication Data
US 2022/0289626 A1    Sep. 15, 2022

(30) Foreign Application Priority Data

Aug. 16, 2019 (EP) .................................... 19192150

(51) Int. Cl.
*C03C 25/255* (2018.01)
*C09J 189/00* (2006.01)

(52) U.S. Cl.
CPC .......... *C03C 25/255* (2018.01); *C09J 189/00* (2013.01)

(58) Field of Classification Search
None
See application file for complete search history.

(56) References Cited

U.S. PATENT DOCUMENTS

| | | |
|---|---|---|
| 5,318,990 A | 6/1994 | Strauss |
| 5,661,213 A | 8/1997 | Arkens et al. |
| 6,706,853 B1 | 3/2004 | Stanssens et al. |
| 6,730,730 B1 | 5/2004 | Hansen et al. |
| 2002/0091185 A1 | 7/2002 | Taylor et al. |
| 2003/0153690 A1 | 8/2003 | Husemoen et al. |
| 2004/0024170 A1 | 2/2004 | Husemoen et al. |
| 2006/0111480 A1 | 5/2006 | Hansen et al. |
| 2007/0006390 A1 | 1/2007 | Clamen et al. |
| 2007/0173588 A1 | 7/2007 | Espiard et al. |
| 2008/0012879 A1 | 1/2008 | Nissen |
| 2009/0227706 A1 | 9/2009 | Hansen et al. |
| 2019/0135688 A1 | 5/2019 | Hjelmgaard |

(Continued)

FOREIGN PATENT DOCUMENTS

| | | |
|---|---|---|
| BE | 420671 A | 6/1937 |
| CN | 107304329 A | 10/2017 |

(Continued)

OTHER PUBLICATIONS

Machine Translation of CN116438242 (Year: 2023).*

(Continued)

*Primary Examiner* — Shawn Mckinnon
(74) *Attorney, Agent, or Firm* — Abel Schillinger, LLP

(57) ABSTRACT

The invention is directed to a formaldehyde-free binder composition for mineral fibres comprising at least one phenol containing compound, at least one protein and at least one divalent metal cation M2+ containing compound.

20 Claims, 1 Drawing Sheet

(56) References Cited

U.S. PATENT DOCUMENTS

| | | | |
|---|---|---|---|
| 2019/0136427 A1 | 5/2019 | Hjelmgaard | |
| 2019/0210323 A1 | 7/2019 | Hjelmggard et al. | |
| 2019/0211486 A1 | 7/2019 | Hjelmgaard | |
| 2020/0047478 A1 | 2/2020 | Hjelmgaard et al. | |
| 2020/0071864 A1 | 3/2020 | Hjelmgaard | |
| 2020/0165399 A1 | 5/2020 | Hjelmgaard et al. | |
| 2020/0308355 A1 | 10/2020 | Hjelmgaard et al. | |
| 2020/0308408 A1 | 10/2020 | Hjelmgaard | |
| 2020/0317921 A1 | 10/2020 | Hjelmgaard | |
| 2021/0137031 A1 | 5/2021 | Hjelmgaard | |

FOREIGN PATENT DOCUMENTS

| | | | |
|---|---|---|---|
| CN | 113840966 | * | 12/2021 |
| CN | 116438242 | * | 7/2023 |
| DE | 4130077 A1 | | 3/1993 |
| EP | 0583086 A1 | | 2/1994 |
| EP | 0990727 A1 | | 4/2000 |
| EP | 1741726 A1 | | 1/2007 |
| WO | 9936368 A1 | | 7/1999 |
| WO | 0105725 A1 | | 1/2001 |
| WO | 0196460 A2 | | 12/2001 |
| WO | 0206178 A1 | | 1/2002 |
| WO | 2004007615 A1 | | 1/2004 |
| WO | 2006061249 A1 | | 6/2006 |
| WO | 2008023032 A1 | | 2/2008 |
| WO | 2017194722 A1 | | 11/2017 |
| WO | 2017194724 A1 | | 11/2017 |
| WO | 2017194726 A1 | | 11/2017 |
| WO | WO2017194717 | * | 11/2017 |
| WO | 2018206133 A1 | | 11/2018 |
| WO | WO2019202478 | * | 10/2019 |

OTHER PUBLICATIONS

Machine Translation of CN113840966 (Year: 2019).*
C. Peña, K. de la Caba, A. Eceiza, R. Ruseckaite, I. Mondragon in Biores. Technol. 2010, 101, pp. 6836-6842.
J. J. Wilker, Nature Chem. Biol. 2011, 7, pp. 579-580.
E. Kaspchak et al., "Effect of divalent cations on bovine serum albumin (BSA) and tannic acid interaction and its influence on turbidity and in vitro protein digestibility", International Journal of Biological Macromolecules, vol. 136, Sep. 1, 2019, pp. 486-492.
M. Martin et al., "Effects of surfactants, pH, and certain cations on precipitation of proteins by tannins", Journal of Chemical Ecology, vol. 11, No. 4, 1985, pp. 485-493.

* cited by examiner

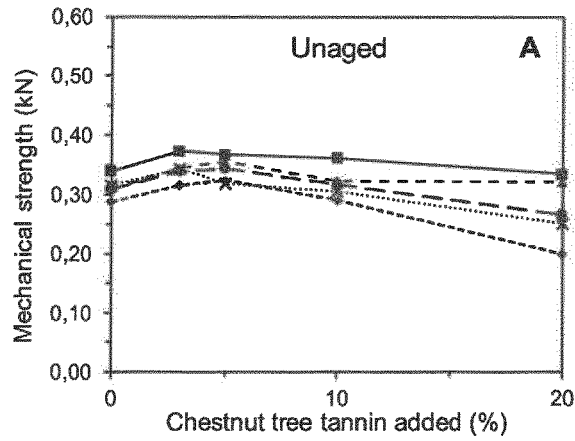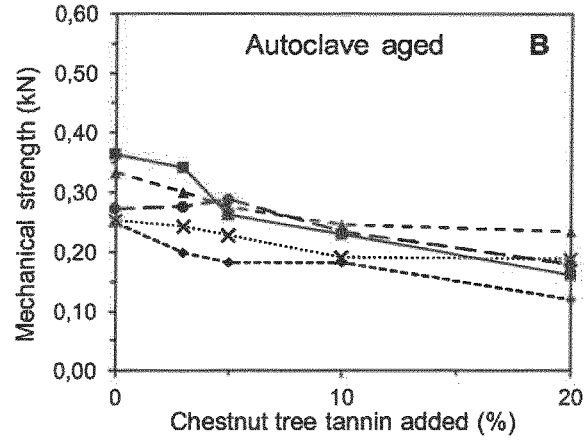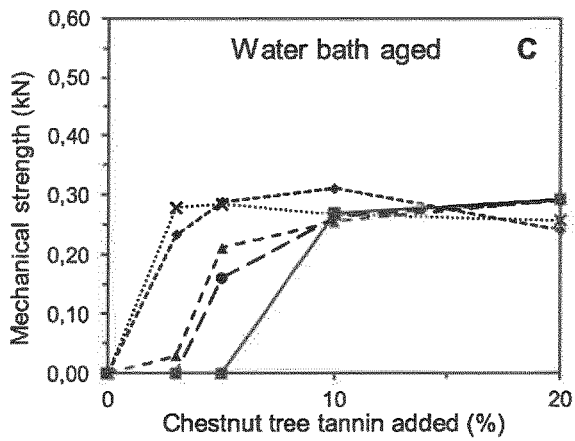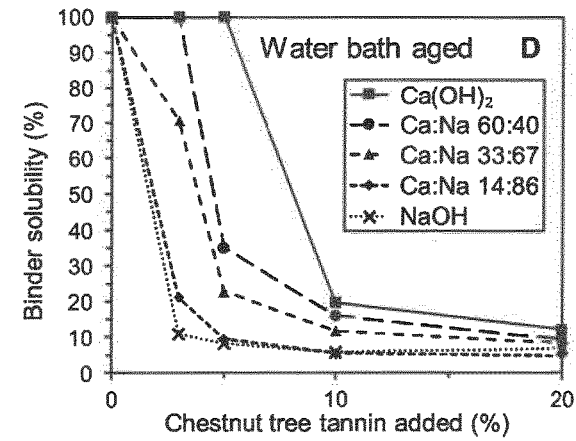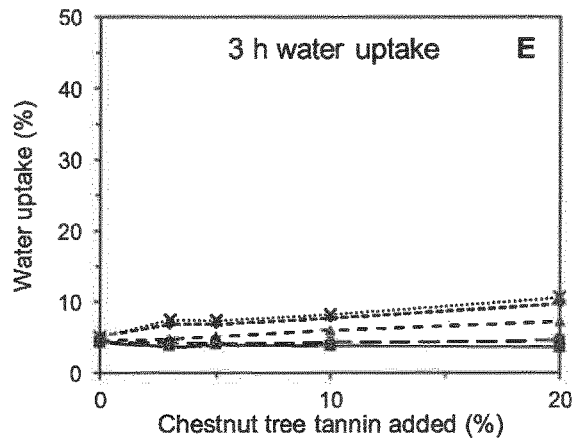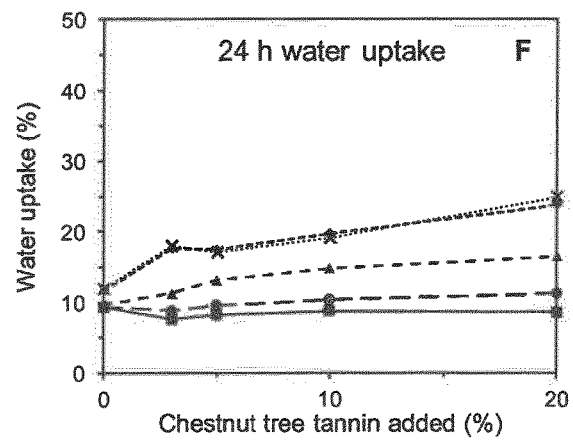

MINERAL WOOL BINDER

FIELD OF THE INVENTION

The present invention relates to a binder composition for mineral fibres, a method of producing a mineral wool product with the binder composition, a mineral wool product made with the binder composition, a use of the binder composition and the use of at least one divalent metal cation $M^{2+}$ containing compound, and the use of at least one divalent metal cation $M^{2+}$ containing compound and at least one monovalent metal cation $M^+$ containing compound, respectively, in a binder composition.

BACKGROUND OF THE INVENTION

Mineral fibre products generally comprise man-made vitreous fibres (MMVF) such as, e.g., glass fibres, ceramic fibres, basalt fibres, slag wool, mineral wool and stone wool (rock wool), which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type, which provide mineral wool products having reduced moisture take-up.

Since some of the starting materials used in the production of these binders are rather expensive chemicals, there is an ongoing need to provide formaldehyde-free binders, which are economically produced.

A further effect in connection with previously known aqueous binder compositions for mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool, which are at least partly produced from renewable materials.

A further effect in connection with previously known aqueous binder compositions for mineral fibres is that they involve components, which are corrosive and/or harmful. This requires protective measures for the machinery involved in the production of mineral wool products to prevent corrosion and also requires safety measures for the persons handling this machinery. This leads to increased costs and health issues and there is therefore a need to provide binder compositions for mineral fibres with a reduced content of corrosive and/or harmful materials.

A yet further effect in connection with previously known aqueous binder compositions from mineral fibres is that these binders are conventionally associated with extensive curing equipment for curing the binder. The curing equipment is conventionally an oven operating at temperatures far above 100° C. such as around 200° C. The oven is several meters long to accommodate the web that is continuously fed into the oven and to ensure that the web is fully cured when leaving the oven. Such oven equipment is associated with extensive energy consumption.

In the recent past, binder compositions have been proposed which are to a large part produced from renewable materials and which are not corrosive and/or harmful.

However, there is still a need to provide binder compositions, which are produced to a large part from renewable material and which are not corrosive and/or harmful and at the same time display improved properties of mineral wool products produced from such binders.

The reference C. Peña, K. de la Caba, A. Eceiza, R. Ruseckaite, I. Mondragon in Biores. Technol. 2010, 101, 6836-6842 is concerned with the replacement of non-biodegradable plastic films by renewable raw materials from plants and wastes of meat industry. In this connection, this reference describes the use of hydrolysable chestnut-tree tannin for modification of a gelatin in order to form films. The reference does not describe binders, in particular not binders for mineral wool.

SUMMARY OF THE INVENTION

Accordingly, it was an object of the present invention to provide a binder composition, which is particularly suitable for bonding mineral fibres, uses renewable materials as starting materials, reduces or eliminates corrosive and/or harmful materials, and at the same time allow improved properties of mineral wool products produced from them.

Further, it was an object of the present invention to provide a binder composition, which does not require high temperature for curing and therefore eliminates need of high temperature to be applied in the production of a product bonded with the binder composition, and at the same time allow improved properties of mineral wool products produced from them.

A further object of the present invention was to provide a mineral wool product bonded with such a binder composition.

A further object of the present invention was to provide a method of making such mineral wool product.

A further object of the present invention was to provide the use of such a binder composition for the preparation of the mineral wool product.

A further object of the present invention was to improve the properties, in particular concerning water uptake, and/or mechanical properties, and/or aging properties, of a mineral wool product comprising mineral fibres bound by a binder resulting from the curing of a binder composition comprising at least one phenol containing compound, and at least one protein.

In accordance with a first aspect of the present invention, there is provided a, preferably formaldehyde-free, binder composition for mineral fibres comprising:
at least one phenol containing compound,
at least one protein,
at least one divalent metal cation $M^{2+}$ containing compound.

In accordance with a second aspect of the present invention, there is provided a mineral wool product comprising mineral fibres bound by a binder resulting from the curing of such a binder composition.

In accordance with a third aspect of the present invention, there is provided a method of producing a mineral wool product, which comprises the steps of contacting mineral fibres with such a binder composition.

In accordance with a fourth aspect of the present invention, there is provided the use of such a binder composition for the preparation of the mineral wool product.

According with a fifth aspect of the present invention, there is provided the use of at least one divalent metal cation $M^{2+}$ containing compound in a binder composition for mineral fibres comprising at least one phenol containing compound, and at least one protein, for improving the water uptake, and/or the mechanical properties, and/or the aging properties of a mineral wool product comprising mineral fibres bound by a binder resulting from the curing of that binder composition.

According with a sixth aspect of the present invention, there is provided the use of at least one divalent metal cation $M^{2+}$ containing compound and at least one monovalent metal cation $M^+$ containing compound in a formaldehyde-free binder composition for mineral fibres comprising at least one phenol containing compound, and at least one protein, for improving the water uptake, and/or the mechanical properties, and/or the aging properties of a mineral wool product comprising mineral fibres bound by a binder resulting from the curing of that binder composition.

The present inventors have surprisingly found that it is possible to obtain a mineral wool product comprising mineral fibres bound by a binder resulting from the curing of a binder composition, whereby the binder composition can be produced from renewable materials to a large degree, does not contain, or contains only to a minor degree, any corrosive and/or harmful agents and the production of the mineral wool product does not lead to pollution such as VOC's (Volatile Organic Compounds) during the preparation, and at the same time showing improved properties, in particular concerning water uptake, and/or mechanical properties, and/or aging properties.

BRIEF DESCRIPTION OF THE DRAWING

In the only drawing,
FIG. 1 is a graphical representation of the results of the experimental work described below.

DESCRIPTION OF THE PREFERRED EMBODIMENTS

The binder composition according to the present invention comprises:
at least one phenol containing compound,
at least one protein,
at least one divalent metal cation $M^{2+}$ containing compound.
In a preferred embodiment, the binders according to the present invention are formaldehyde free.

For the purpose of the present application, the term "formaldehyde free" is defined to characterize a mineral wool product where the emission is below 5 $\mu g/m^2/h$ of formaldehyde from the mineral wool product, preferably below 3 $\mu g/m^2/h$.

Preferably, the test is carried out in accordance with ISO 16000 for testing aldehyde emissions.

A surprising advantage of embodiments of mineral wool products according to the present invention is that they show self-healing properties. After being exposed to very harsh conditions when mineral wool products lose a part of their strength, the mineral wool products according to the present invention can regain a part of the original strength. This is in contrast to conventional mineral wool products for which the loss of strength after being exposed to harsh environmental conditions is irreversible. While not wanting to be bound to any particular theory, the present inventors believe that this surprising property in mineral wool products according to the present invention is due to the complex nature of the bonds formed in the network of the protein crosslinked by the phenol containing compound which also includes quaternary structures and hydrogen bonds and allows bonds in the network to be established after returning to normal environmental conditions. For an insulation product, which when e.g. used as a roof insulation can be exposed to very high temperatures in the summer, this is an important advantage for the long term stability of the product.

Divalent Metal Cation Containing Compound

The present inventors have surprisingly found, that the properties of a mineral wool product prepared by use of a binder comprising at least one phenol containing compound and at least one protein, can be strongly improved by adding at least one divalent metal cation $M^{2+}$ containing compound to the binder composition.

In particular, the properties of water uptake, and/or mechanical properties, and/or aging properties of a mineral wool product can be significantly improved.

In one embodiment, the at least one divalent metal cation $M^{2+}$ containing compound comprises at least one divalent metal cations $M^{2+}$ of earth alkaline metals, Mn, Fe, Cu, Zn, Sn.

In one embodiment, the at least one divalent metal cation $M^{2+}$ containing compound is an ionic compound, in particular a salt, containing a divalent metal cation $M^{2+}$, in particular earth alkaline metals, Mn, Fe, Cu, Zn, Sn or mixtures thereof, and one or more counter-ions in form of anions.

In one embodiment, the divalent metal cation $M^{2+}$ containing compound comprises one or more compounds selected from the group of $M(OH)_2$, $MO$, $M(HCO_3)_2$, $MCO_3$, $M(H_2PO_4)_2$, $MHPO_4$, $M_3(PO_4)_2$, $M(HPO_3)$, $M(H_2PO_2)_2$, $MSO_4$, $MCl_2$, $MHNSO_3$, such as $M(OH)_2$.

In one embodiment, the divalent metal cation $M^{2+}$ containing compound comprises one or more compounds selected from $M(ClO_3)_2$ and $M(ClO_4)_2$.

In one embodiment, the divalent metal cation $M^{2+}$ containing compound comprises $Ca^{2+}$.

In an alternative embodiment, the divalent metal cation containing compound comprises $Mn^{2+}$, $Fe^{2+}$, $Cu^{2+}$, $Zn^{2+}$, $Sn^{2+}$, $Ba^{2+}$, $Nd^{2+}$ or mixtures thereof.

In one embodiment, the binder composition comprises the at least one divalent metal cation compound in an amount of 0.1 wt. % to 10 wt. %, such as 0.2 wt. % to 8 wt. %, such as 0.3 wt. % to 5 wt. %, such as 0.4 wt. % to 4.3 wt. %, such as 1.0 wt. % to 4.3 wt. %, based on the combined dry weight of phenol containing compound and protein.

In one embodiment, the binder composition further comprises at least one monovalent metal cation $M^+$ containing compound, in particular in form of at least one monovalent metal cation from an alkali metal containing compound.

The present inventors have surprisingly found that by addition of both a divalent metal cation $M^{2+}$ containing compound and a monovalent metal cation $M^+$ containing compound, particularly good properties of the mineral wool products prepared by the binder composition can be achieved, and that in particular the properties of the mineral wool products prepared by such a binder composition can be tailor-made depending on the requirements for such a mineral wool product.

In one embodiment, the binder composition comprises at least one monovalent metal cation $M^+$ in form of at least one metal cation from an alkali metal.

In one embodiment, the binder composition comprises at least one monovalent metal cation in form of a monovalent metal cation of Li, Na, K, such as Na.

In one embodiment, the binder composition comprises at least one monovalent metal cation $M^+$ containing compound in an amount of 0.01 wt. % to 6 wt. %, such as 0.1 wt. % to 5 wt. %, such as 0.2 wt. % to 4 wt. %, such as 0.3 wt. % to 3.3 wt. %, such as 0.3 wt. % to 2.0 wt. %, based on the combined dry weight of phenol containing compound and protein.

The present inventors have surprisingly found that by controlling the ratio of the divalent metal cation $M^{2+}$ containing compound to the monovalent metal cation $M^+$ containing compound in the binder compositions, specific property profiles can be achieved in the mineral wool product produced from the binder compositions.

In one embodiment, the binder composition comprises at least one divalent metal cation $M^{2+}$ containing compound and at least one monovalent metal cation $M^+$ containing compound and wherein the molar ratio of the divalent to monovalent metal cation is in the range of 10:90 to 90:10, such as 14.3:85.7 to 90:10, such as 14.3:85.7 to 60:40, such as 20:80 to 80:20, such as 25:75 to 75:25, such as 33.3:66.7 to 60:40 such as 40:60 to 60:40, such as 50:50.

Phenol Containing Compound Component of the Binder

The binder composition according to the present invention comprises a phenol containing compound component of the binder, in particular one or more phenolic compounds.

Phenolic compounds, or phenolics, are compounds that have one or more hydroxyl group attached directly to an aromatic ring. Polyphenols (or polyhydroxyphenols) are compounds that have more than one phenolic hydroxyl group attached to one or more aromatic rings. Phenolic compounds are characteristic of plants and as a group they are usually found as esters or glycosides rather than as free compounds.

The term phenolics covers a very large and diverse group of chemical compounds. Preferably, the phenol containing compound is a compound according to the scheme based on the number of carbons in the molecule as detailed in by W. Vermerris, R. Nicholson, in *Phenolic Compound Biochemistry*, Springer Netherlands, 2008.

In one embodiment, the phenol containing compound comprises a phenol containing compound such as simple phenolics, such as hydroxybenzoic acids, such as hydroxybenzoic aldehydes, such as hydroxyacetophenones, such as hydroxyphenylacetic acids, such as cinnamic acids, such as cinnamic acid esters, such as cinnamyl aldehydes, such as cinnamyl alcohols, such as coumarins, such as isocoumarins, such as chromones, such as flavonoids, such as chalcones, such as dihydrochalcones, such as aurones, such as flavanones, such as flavanonols, such as flavans, such as leucoanthocyanidins, such as flavan-3-ols, such as flavones, such as anthocyanidins, such as deoxyanthocyanidines, such as anthocyanins, such as biflavonyls, such as benzophenones, such as xanthones, such as stilbenes, such as betacyanins, such as polyphenols and/or polyhydroxyphenols, such as lignans, neolignans (dimers or oligomers from coupling of monolignols such as p-coumaryl alcohol, coniferyl alcohol and sinapyl alcohol), such as lignins (synthesized primarily from the monolignol precursors p-coumaryl alcohol, coniferyl alcohol and sinapyl alcohol), such as tannins, such as tannates (salts of tannins), such as condensed tannins (proanthocyanidins), such as hydrolysable tannins, such as gallotannins, such as ellagitannins, such as complex tannins, such as tannic acid, such as phlobabenes, such as phlorotannins.

In one embodiment, the phenol containing compound is selected from the group consisting of simple phenolics, phenol containing compounds with a more complex structure than a $C_6$ structure, such as oligomers of simple phenolics, polyphenols, and/or polyhydroxyphenols.

The phenol containing compounds according to the present invention can also be synthetic or semisynthetic molecules or constructs that contain phenols, polyphenols. An example for such a construct is a protein, peptide, peptoids (such as linear and/or cyclic oligomers and/or polymers of N-substituted glycines, N-substituted β-alanines), or arylopeptides (such as linear and/or cyclic oligomers and/or polymers of N-substituted aminomethyl benzamides) modified with phenol containing side chains. A dendrimer decorated with phenol containing side chains is another example.

In one embodiment, the phenol containing compound according to the present invention is a quinone. Quinones are oxidized derivatives of aromatic compounds and are often readily made from reactive aromatic compounds with electron-donating substituents such as phenolics. Quinones useful for the present invention include benzoquinones, napthoquinone, anthraquinone and lawsone.

Tannins comprise a group of compounds with a wide diversity in structure that share their ability to bind and precipitate proteins. Tannins are abundant in many different plant species, in particular oak, chestnut, staghorn sumac and fringe cups. Tannins can be present in the leaves, bark and fruits. Tannins can be classified into three groups: condensed tannins, hydrolysable tannins and complex tannins. Condensed tannins, or proanthocyanidins, are oligomeric or polymeric flavonoids consisting of flavan-3-ol (catechin) units. Gallotannins are hydrolysable tannins with a polyol core substituted with 10-12 gallic acid residues. The most commonly found polyol in gallotannins is D-glucose although some gallotannins contain catechin and triterpenoid units as the core polyol. Ellagitanins are hydrolysable tannins that differ from gallotannins in that they contain additional C—C bonds between adjacent galloyl moieties. Complex tannins are defined as tannins in which a catechin unit is bound glycosidically to either a gallotannin or an ellagitannin unit.

In one embodiment, the tannin is selected from one or more components from the group consisting of tannic acid, condensed tannins (proanthocyanidins), hydrolysable tannins, gallotannins, ellagitannins, complex tannins, and/or tannin originating from one or more of oak, chestnut, staghorn sumac, fringe cups, quebracho, acacia, mimosa, black wattle bark, grape, gallnut, gambier, myrobalan, tara, valonia, and eucalyptus.

The inventors have found that a wide range of such phenol containing compounds can be used to crosslink proteins which allows a binder composition to be formed. Often, these phenol containing compound components are obtained from vegetable tissues and are therefore a renewable material. In some embodiments, the compounds are also non-toxic and non-corrosive. As a further advantage, these compounds are antimicrobial and therefore impart their antimicrobial properties to the mineral wool product bound by such a binder.

Protein Component of the Binder

Preferably, the protein component of the binder is selected from the group consisting of proteins from animal sources,
including collagen, gelatin, hydrolysed gelatin, and protein from milk (casein, whey), eggs; proteins from jellyfish, proteins produced by recombinant techniques; proteins from insects, such as silk worms, such as sericin; proteins from vegetable sources, including proteins from algaes, legumes,
cereals, whole grains, nuts, seeds and fruits, like protein from buckwheat, oats, rye, millet, maize (corn), rice, wheat, bulgur, sorghum, amaranth, *quinoa*, soybeans (soy protein), lentils, kidney beans, white beans, mung beans, chickpeas, cowpeas, lima beans, pigeon peas, lupines, wing beans, almonds, Brazil nuts, cashews, pecans, walnuts, rapeseeds, cotton seeds, pumpkin seeds, hemp seeds,
sesame seeds, and sunflower seeds; polyphenolic proteins such as mussel foot protein.

Collagen is a very abundant material in living tissue: It is the main component in connective tissue and constitutes 25-35% of the total protein content in mammals. Gelatin is derived from chemical degradation of collagen. Gelatin may also be produced by recombinant techniques. Gelatin is water soluble and has a molecular weight of 10.000 to 500.000 g/mol, such as 30.000 to 300.000 g/mol dependent on the grade of hydrolysis. Gelatin is a widely used food product and it is therefore generally accepted that this compound is totally non-toxic and therefore no precautions are to be taken when handling gelatin.

Gelatin is a heterogeneous mixture of single or multi-stranded polypeptides, typically showing helix structures. Specifically, the triple helix of type I collagen extracted from skin and bones, as a source for gelatin, is composed of two $\alpha 1(I)$ and one $\alpha 2(I)$ chains.

Gelatin solutions may undergo coil-helix transitions.

A type gelatins are produced by acidic treatment. B type gelatins are produced by basic treatment.

Chemical cross-links may be introduced to gelatin. In one embodiment, transglutaminase is used to link lysine to glutamine residues; in one embodiment, glutaraldehyde is used to link lysine to lysine, in one embodiment, tannins are used to link lysine residues.

The gelatin can also be further hydrolysed to smaller fragments of down to 3000 g/mol.

On cooling a gelatin solution, collagen like helices may be formed.

Gelatin may form helix structures.

In one embodiment, the cured binder comprising protein comprises helix structures.

In one embodiment, the at least one protein is a low strength gelatin, such as a gelatin having a gel strength of 30 to 125 Bloom.

In one embodiment, the at least one protein is a medium strength gelatin, such as a gelatin having a gel strength of 125 to 180 Bloom.

In one embodiment, the at least one protein is a high strength gelatin, such as a gelatin having a gel strength of 180 to 300 Bloom.

In a preferred embodiment, the gelatin is preferably originating from one or more sources from the group consisting of mammal, bird species, such as from cow, pig, horse, fowl, and/or from scales, skin of fish.

In one embodiment, urea may be added to the binder compositions according to the present invention. The inventors have found that the addition of even small amounts of urea causes denaturation of the gelatin, which can slow down the gelling, which might be desired in some embodiments. The addition of urea might also lead to a softening of the product.

The inventors have found that the carboxylic acid groups in gelatins interact strongly with trivalent and tetravalent ions, for example aluminum salts. This is especially true for type B gelatins which contain more carboxylic acid groups than type A gelatins.

The present inventors have found that in some embodiments, curing/drying of binder compositions according to the present invention including gelatin should not start off at very high temperatures.

The inventors have found that starting the curing at low temperatures may lead to stronger products. Without being bound to any particular theory, it is assumed by the inventors that starting curing at high temperatures may lead to an impenetrable outer shell of the binder composition which hinders water from underneath to get out.

Surprisingly, the binders according to the present invention including gelatins are very heat resistant. The present inventors have found that in some embodiments the cured binders can sustain temperatures up to 300° C. without degradation.

Reaction of the Binder Components

Without wanting to be bound to any particular theory, the present inventors believe that the reaction between the phenol containing compound and the protein at least partly relies on an oxidation of phenols to quinones followed by nucleophilic attack of amine and/or thiol groups from the protein which leads to a crosslinking of the proteins by the phenol containing compounds.

Without wanting to be bound by any particular theory, the present inventors believe that the improvement of the properties of the mineral wool products prepared by the binders according to the present invention due to the presence of the divalent metal cation $M^{2+}$ containing compound can be explained by a chelation-effect, in which the $M^{2+}$ crosslinks negatively charge groups of the cured binder.

By providing at least one divalent metal cation $M^{2+}$ containing compound and at least one monovalent metal cation $M^+$ containing compound, this crosslinking effect can, according to the theory of the inventors, be modulated and the properties of the mineral wool products can be tailor-made.

In a preferred embodiment, the content of the phenol containing compound in the binder composition according to the present invention is from 1 to 70 wt. %, such as 2 to 60 wt. %, such as 3 to 50 wt. %, such as 4 to 40 wt. %, such as 5 to 35 wt. %, based on dry protein basis.

In an alternative preferred embodiment, the mass ratio of (lysine+cystein) in the protein to (phenol) in the phenol containing compound is 1:5.78-1:0.08, such as 1:2.89-1:0.09, such as 1:1.93-1:0.12, such as 1:1.45-1:0.15, such as 1:1.16-1:0.17.

The term mass ratio of (lysine+cystein) in the protein to (phenol) in the phenol containing compound is to be understood to mean the ratio of the combined mass of the lysine+cystein residues in the protein component to the combined mass of the phenol residues in the phenol containing compound.

The present inventors have found that the curing of the binder is strongly accelerated under alkaline conditions. Therefore, in one embodiment, the binder composition for mineral fibres comprises a pH-adjuster, preferably in form of a base, such as organic base, such as amine or salts thereof, inorganic bases, such as ammonia or salts thereof.

In a preferred embodiment, the binder composition according to the present invention has a pH of more than 7, such as more than 8, such as more than 9, such as in the range of above 7 and below 11.

In one embodiment, the protein comprises polyphenolic proteins.

These proteins contain a high level of a post-translationally modified-oxidized-form of tyrosine, L-3,4-dihydroxyphenylalanine (levodopa, L-DOPA). See also J. J. Wilker Nature Chem. Biol. 2011, 7, 579-580 for a reference to these proteins.

Additives

In a preferred embodiment, the binder composition according to the present invention contains additives.

These additives may be components such as one or more reactive or nonreactive silicones and may be added to the binder. Preferably, the one or more reactive or nonreactive silicone is selected from the group consisting of silicone constituted of a main chain composed of organosiloxane residues, especially diphenylsiloxane residues, alkylsiloxane residues, preferably dimethylsiloxane residues, bearing at least one hydroxyl, acyl, carboxyl or anhydride, amine, epoxy or vinyl functional group capable of reacting with at least one of the constituents of the binder composition and is preferably present in an amount of 0.1-15 weight-%, preferably from 0.1-10 weight-%, more preferably 0.3-8 weight-%, based on the total binder mass.

In one embodiment, an emulsified hydrocarbon oil may be added to the binder.

As already described above, many phenol containing compounds, in particular polyphenols, have antimicrobial properties and therefore impart antimicrobial characteristic to the binder. Nevertheless, in one embodiment, an anti-fouling agent may be added to the binder compositions.

In one embodiment, an anti-swelling agent may be added to the binder, such as tannic acid and/or tannins.

In one embodiment, the binder composition according to the present invention contains additives in form of amine linkers and/or thiol/thiolate linkers. These additives in form of amine linkers and/or thiol/thiolate linkers are particular useful when the crosslinking reaction of the binder proceeds via the quinone-amine and/or quinone-thiol pathway.

In one embodiment, the binder compositions according to the present invention contain further additives in form of additives selected from the group consisting of PEG-type reagents, silanes, fatty acid esters of glycerol, and hydroxyl apatites.

Oxidising agents as additives can serve to increase the oxidising rate of the phenolics. One example is the enzyme tyrosinase which oxidizes phenols to hydroxyphenols/quinones and therefore accelerates the binder forming reaction.

In another embodiment, the oxidising agent is oxygen, which is supplied to the binder.

In one embodiment, the curing is performed in oxygen-enriched surroundings.

A Mineral Wool Product Comprising Mineral Wool Fibres Bound by a Binder

The present invention is also directed to a mineral wool product bound by a binder resulting from the curing of the binder composition described.

In a preferred embodiment, the density of the mineral wool product is in the range of 10-1200 $kg/m^3$, such as 30-800 $kg/m^3$, such as 40-600 $kg/m^3$, such as 50-250 $kg/m^3$, such as 60-200 $kg/m^3$.

In a preferred embodiment, the mineral wool product according to the present invention is an insulation product, in particular having a density of 10 to 200 $kg/m^3$.

In an alternative embodiment, the mineral wool product according to the present invention is a facade panel, in particular having a density of 1000-1200 $kg/m^3$.

In a preferred embodiment, the mineral wool product according to the present invention is an insulation product.

In a preferred embodiment, the loss on ignition (LOI) of the mineral wool product according to the present invention is within the range of 0.1 to 25.0%, such as 0.3 to 18.0%, such as 0.5 to 12.0%, such as 0.7 to 8.0% by weight.

In one embodiment the mineral wool product is a mineral wool insulation product, such as a mineral wool thermal or acoustical insulation product.

In one embodiment the mineral wool product is a horticultural growing media.

Method of Producing a Mineral Wool Product

The present invention also provides a method for producing a mineral wool product by binding mineral fibres with the binder composition.

A particular advantage of the mineral wool product according to the present invention is that it does not require high temperatures for curing. This does not only save energy, reduces VOC and obviates the need for machinery to be highly temperature resistant, but also allows for a high flexibility in a process for the production of mineral wool products with these binders.

In one embodiment the method comprises the steps of:
making a melt of raw materials,
fiberizing the melt by means of a fiber forming apparatus to form mineral fibres,
providing the mineral fibres in the form of a collected web,
mixing the binder with the mineral fibres before, during or after the provision of the collected web to form a mixture of mineral fibres and binder,
curing the mixture of mineral fibres and binder.

In one embodiment, the binder is supplied in the close vicinity of the fibre forming apparatus, such as a cup spinning apparatus or a cascade spinning apparatus, in either case immediately after the fibre formation. The fibres with applied binder are thereafter conveyed onto a conveyor belt as a web.

The web may be subjected to longitudinal or length compression after the fibre formation and before substantial curing has taken place.

Fiber Forming Apparatus

There are various types of centrifugal spinners for fiberizing mineral melts.

A conventional centrifugal spinner is a cascade spinner which comprises a sequence of a top (or first) rotor and a subsequent (or second) rotor and optionally other subsequent rotors (such as third and fourth rotors). Each rotor rotates about a different substantially horizontal axis with a rotational direction opposite to the rotational direction of the or each adjacent rotor in the sequence. The different horizontal axes are arranged such that melt which is poured on to the top rotor is thrown in sequence on to the peripheral surface of the or each subsequent rotor, and fibres are thrown off the or each subsequent rotor, and optionally also off the top rotor.

In one embodiment, a cascade spinner or other spinner is arranged to fiberize the melt and the fibres are entrained in air as a cloud of the fibres.

Many fiber forming apparatuses comprise a disc or cup that spins around a substantially vertical axis. It is then conventional to arrange several of these spinners in-line, i.e. substantially in the first direction, for instance as described in GB-A-926,749, U.S. Pat. No. 3,824,086 and WO-A-83/03092.

There is usually a stream of air associated with the one or each fiberizing rotor whereby the fibres are entrained in this air as they are formed off the surface of the rotor.

In one embodiment, binder and/or additives is added to the cloud of fibres by known means. The amount of binder and/or additive may be the same for each spinner or it may be different.

In one embodiment, a hydrocarbon oil may be added into the cloud of fibres.

As used herein, the term "collected web" is intended to include any mineral fibres that have been collected together on a surface, i.e. they are no longer entrained in air, e.g. the fiberized mineral fibres, granulate, tufts or recycled web waste. The collected web could be a primary web that has been formed by collection of fibres on a conveyor belt and provided as a starting material without having been cross-lapped or otherwise consolidated.

Alternatively, the collected web could be a secondary web that has been formed by crosslapping or otherwise consolidating a primary web. Preferably, the collected web is a primary web.

In one embodiment the mixing of the binder with the mineral fibres is done after the provision of the collected web in the following steps:
  subjecting the collected web of mineral fibres to a disentanglement process,
  suspending the mineral fibres in a primary air flow,
  mixing binder composition with the mineral fibres before, during or after the disentanglement process to form a mixture of mineral fibres and binder.

A method of producing a mineral wool product comprising the process step of disentanglement is described in EP10190521, which is incorporated by reference.

In one embodiment, the disentanglement process comprises feeding the collected web of mineral fibres from a duct with a lower relative air flow to a duct with a higher relative air flow. In this embodiment, the disentanglement is believed to occur, because the fibres that enter the duct with the higher relative air flow first are dragged away from the subsequent fibres in the web. This type of disentanglement is particularly effective for producing open tufts of fibres, rather than the compacted lumps that can result in an uneven distribution of materials in the product.

According to a particularly preferred embodiment, the disentanglement process comprises feeding the collected web to at least one roller which rotates about its longitudinal axis and has spikes protruding from its circumferential surface. In this embodiment, the rotating roller will usually also contribute at least in part to the higher relative air flow. Often, rotation of the roller is the sole source of the higher relative air flow.

In preferred embodiments, the mineral fibres and optionally the binder are fed to the roller from above. It is also preferred for the disentangled mineral fibres and optionally the binder to be thrown away from the roller laterally from the lower part of its circumference. In the most preferred embodiment, the mineral fibres are carried approximately 180 degrees by the roller before being thrown off.

The binder may be mixed with the mineral fibres before, during or after the disentanglement process. In some embodiments, it is preferred to mix the binder with the fibres prior to the disentanglement process. In particular, the fibres can be in the form of an uncured collected web containing binder.

It is also feasible that the binder be pre-mixed with a collected web of mineral fibres before the disentanglement process. Further mixing could occur during and after the disentanglement process. Alternatively, it could be supplied to the primary air flow separately and mixed in the primary air flow.

The mixture of mineral fibres and binder is collected from the primary air flow by any suitable means. In one embodiment, the primary air flow is directed into the top of a cyclone chamber, which is open at its lower end and the mixture is collected from the lower end of the cyclone chamber.

The mixture of mineral fibres and binder is preferably thrown from the disentanglement process into a forming chamber.

Having undergone the disentanglement process, the mixture of mineral fibres and binder is collected, pressed and cured. Preferably, the mixture is collected on a foraminous conveyor belt having suction means positioned below it.

In a preferred method according to the invention, the mixture of binder and mineral fibres, having been collected, is pressed and cured.

In a preferred method according to the invention, the mixture of binder and mineral fibres, having been collected, is scalped before being pressed and cured.

The method may be performed as a batch process, however according to an embodiment the method is performed at a mineral wool production line feeding a primary or secondary mineral wool web into the fibre separating process, which provides a particularly cost efficient and versatile method to provide composites having favourable mechanical properties and thermal insulation properties in a wide range of densities.

At the same time, because of the curing at ambient temperature, the likelihood of uncured binder spots is strongly decreased.

Curing

The web is cured by a chemical and/or physical reaction of the binder components.

In one embodiment, the curing takes place in a curing device.

In one embodiment the curing is carried out at temperatures from 5 to 150° C., such as 5 to 60° C., such as 20 to 40° C.

The curing process may commence immediately after application of the binder to the fibres.

In one embodiment the curing process comprises cross-linking and/or water inclusion as crystal water.

In one embodiment the cured binder contains crystal water that may decrease in content and raise in content depending on the prevailing conditions of temperature, pressure and humidity.

In one embodiment the curing takes place in a conventional curing oven for mineral wool production operating at a temperature of from 5 to 150° C., such as 5 to 60° C., such as 20 to 40° C.

In one embodiment the curing process comprises a drying process.

In a preferred embodiment, the curing of the binder in contact with the mineral fibers takes place in a heat press.

The curing of a binder in contact with the mineral fibers in a heat press has the particular advantage that it enables the production of high-density products. In one embodiment the curing process comprises drying by pressure. The pressure may be applied by blowing air or gas to the mixture of mineral fibres and binder. The blowing process may be accompanied by heating or cooling or it may be at ambient temperature.

In one embodiment the curing process takes place in a humid environment.

The humid environment may have a relative humidity RH of 60-99%, such as 70-95%, such as 80-92%. The curing in a humid environment may be followed by curing or drying to obtain a state of the prevalent humidity.

The mineral wool product can be in any conventional configuration, for instance a mat or slab, and can be cut and/or shaped (e.g. into pipe sections) before, during or after curing of the binder.

The present invention also provides a use of a binder composition as described above for the production of a mineral fibre product.

In one embodiment, the present invention provides a use of one or more divalent metal cations $M^{2+}$ containing compounds in a formaldehyde-free binder composition for mineral fibres comprising at least one phenol containing compound, and at least one protein, for improving the water uptake, and/or the mechanical properties, and/or the aging properties of a mineral wool product comprising mineral fibres bound by a binder resulting from the curing of that binder composition.

In one embodiment, the present invention provides a use of one or more divalent metal cations $M^{2+}$ containing compounds and one or more monovalent cations $M^+$ containing compounds in a formaldehyde-free binder composition for mineral fibres comprising at least one phenol containing compound, and at least one protein, for improving the water uptake, and/or the mechanical properties, and/or the aging properties of a mineral wool product comprising mineral fibres bound by a binder resulting from the curing of that binder composition.

In one embodiment, the divalent metal cation $M^{2+}$ containing compound comprises $Ca^{2+}$.

In one embodiment, the monovalent metal cation containing compound is in form of a monovalent metal cation of Li, Na, K such as Na.

Advantages of the Binder Composition

The mineral wool product according to the present invention has the surprising advantage that it can be produced by a very simple binder which requires as little as only three components, namely at least one protein, at least one phenol containing compound, and at least one divalent metal cation $M^{2+}$ containing compound. The mineral wool product according to the present invention is therefore produced from natural and non-toxic components and is therefore safe to work with. At the same time, the mineral wool product according to the present invention is produced from a binder based on renewable resources, and results in improved properties of the mineral wool product.

A further advantage is the possibility of curing at ambient temperature or in the vicinity of ambient temperature. This not only leads to savings of energy consumption and less complexity of the machinery required but also decreases the likelihood of uncured binder spots, which can occur during thermal curing of conventional binders.

A further advantage is the strongly reduced punking risk.

Punking may be associated with exothermic reactions during manufacturing of the mineral wool product which increase temperatures through the thickness of the insulation causing a fusing or devitrification of the mineral fibres and eventually creating a fire hazard. In the worst case, punking causes fires in the stacked pallets stored in warehouses or during transportation.

Yet another advantage is the absence of emissions or strongly reduced degree of emission during curing, in particular the absence or strongly reduced degree of VOC emissions.

Further important advantages are the self-repair capacities of mineral wool products produced from the binders.

A further advantage of the mineral wool products produced with the binder according to the present invention is that they show improved properties, in particular concerning water uptake and/or mechanical properties and/or aging properties, compared to previously known mineral wool products, in particular over previously known mineral wool products produced from binders derived from renewable resources. This opens the possibility for making tailor-made products, like pipe sections.

EXAMPLES

In the following examples, several binders which fall under the definition of the present invention were prepared and compared to binders according to the prior art.

Experimental Methods and Definitions

General Experimental Methods

IMAGEL® LA gelatine (Type A, porcine, 120 bloom) and IMAGEL® LB gelatine (Type B, porcine, 122 bloom) was obtained from GELITA AG. Sericin (*Bombyx mori*, silkworm) was obtained from Sigma-Aldrich. Chestnut tree tannin (Vinoferm Tannorouge, food grade) was obtained from Brouwland bvba. Quebracho tannin (Tannivin® Structure, high proanthocyanidin content) was obtained from Erbslöh. 75% aq. glucose syrup with a DE-value of 95 to less than 100 (C*sweet D 02767 ex Cargill) was supplied by Cargill. Silane (Momentive VS-142) was supplied by Momentive. 50% aq. hypophosphorous acid, 28% aq. ammonia and all other components were obtained in high purity from Sigma-Aldrich. All components for which a concentration is not detailed above were assumed completely pure and anhydrous for simplicity.

Measurements of pH were performed using a Mettler Toledo SevenCompact™ S220 pH meter equipped with a Mettler Toledo InLab® Expert Pro-ISM pH electrode and temperature probe.

Stone shots (predominantly rounded particles which have the same melt composition as the stone wool fibers) formed during the cascade spinning process of a stone melt in the production of stone wool fibers were obtained from a ROCKWOOL® factory in the Netherlands. The crude stone shot mixture was first sifted to remove shots with >1.2 mm diameter sizes as well as any remaining stone wool bundles. The stone shots were then heat treated overnight at 590° C. to remove any trace organics. After cooling, the stone shots were sifted again, this time isolating the fractions with diameter sizes of 0.25-0.50 mm while the fractions with smaller or larger diameter sizes were discarded. The stone shot fractions with diameter sizes 0.25-0.50 mm were washed thoroughly first in cold tap water and then in demineralized water. The sifted and cleaned stone shots were dried overnight at 120° C., allowed to cool to ambient temperature, and where then stored at ambient temperature in a closed container until use.

FUNKTION heat resistant silicone forms for manufacture of bars (4×5 slots per form; slot top dimension: length=5.6 cm, width=2.5 cm; slot bottom dimension: length=5.3 cm, width=2.2 cm; slot height=1.1 cm) were obtained from F&H of Scandinavia A/S.

Three-point bending tests were recorded on a Bent Tram SUT 3000/520 test machine (test speed: 10.0 mm/min; rupture level: 50 N; nominal strength: 30 N/mm2; support distance: 40 mm; max deflection 20 mm; nominal E-modulus 10000 N/mm2). The bars were placed with the "top face" up (i.e. the face with the dimensions length 5.6 cm, width=2.5 cm) in the machine.

New tin foil containers for use in measurement of binder solids (reference binders A and B only) and of loss of ignition of composite bars were heat-treated at 590° C. for 15 minutes prior to use to remove all organics.

Binder Component Solids Content—Definition

The content of each of the components in a given binder solution before curing is based on the anhydrous mass of the components. The following formula can be used:

$$\text{Binder component solids content (\%)} = \frac{\text{binder component } A \text{ solids (g)} + \text{binder component } B \text{ solids (g)} + \ldots}{\text{total weight of mixture (g)}} \times 100\%$$

Binder Solids—Definition and Procedure (Only Reference Binders A and B)

The content of binder after curing is termed "binder solids".

Disc-shaped stone wool samples (diameter: 5 cm; height 1 cm) were cut out of stone wool and heat-treated at 590° C. for at least 30 minutes to remove all organics. The solids of the binder mixture (see below for mixing examples) were measured by distributing a sample of the binder mixture (approx. 2 g) onto a heat treated stone wool disc in a tin foil container. The tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids were calculated as an average of the two results.

Reaction Loss—Definition (Only Reference Binders A and B)

The reaction loss is defined as the difference between the binder component solids content and the binder solids.

Manufacture of Composite Bars

A 15%-wt. binder solution or 15% binder solids solution (only for reference binders A and B) was obtained as described in the examples below. A sample of the binder solution (16.0 g) was mixed well with shots (90.0 g). The resulting mixture was then filled into four slots in a heat resistant silicone form for making bars. During the manufacture of each composite bar, the mixtures placed in the slots were pressed as required and then evened out with a plastic spatula to generate an even bar surface. In general, 28-32 bars were made in this fashion from each binder composition. The production of a surplus of bars allowed for discarding bars during the various treatment processes due to the presence of visual irregularities such as uneven surfaces, cracks and/or air pockets created during the manufacturing process. Bars made using reference binder A were cured for 1 h at 200° C. while bars made using reference binder B were cured for 1 h at 225° C. Binders according to the present invention as well as all other reference binders were cured and dried at room temperature for 2-3 days. The bars were carefully taken out of the containers, turned upside down and left for 1-2 days further at room temperature to cure and dry completely.

Ageing Treatment of Composite Bars

Ageing treatment of composite bars was performed by subjecting the bars to autoclave treatment (15 min/120° C./1.2 bar) or water bath treatment (3 h/80° C.) followed by cooling to room temperature and drying for 2-3 days.

Measurement of Mechanical Strengths of Composite Bars

The maximum load force required to break composite bars was recorded in a three-point bending test. For each data point, an average value was calculated on the basis of five bars that had been subjected to identical treatment.

Measurement of Loss of Ignition (LOI) of Composite Bars

The loss of ignition (LOI) of the composite bars was measured in small tin foil containers by treatment at 590° C. The tin foil container was weighed and four bars (usually after being broken in the three-point bending test) were placed into the tin foil container. The ensemble was weighed and was then heat-treated at 590° C. for 30 minutes. After cooling to room temperature, the weight was recorded again and the loss of ignition (LOI) was calculated using the following formula:

$$LOI\ (\%) = \frac{\text{Weight of bars before heat treatment (g)} - \text{Weight of bars after heat treatment (g)}}{\text{Weight of bars before heat treatment (g)}} \times 100\%$$

Water Absorption Measurements

The water absorption of the binders was measured by weighing three bars and then submerging the bars in water (approx. 250 mL) in a beaker (565 mL, bottom Ø=9.5 cm; top Ø=10.5 cm; height=7.5 cm) for 3 h or 24 h. The bars were placed next to each other on the bottom of the beaker with the "top face" down (i.e. the face with the dimensions length=5.6 cm, width=2.5 cm). After the designated amount of time, the bars were lifted up one by one and allowed to drip off for one minute. The bars were held (gently) with the length side almost vertical so that the droplets would drip from a corner of the bar. The bars were then weighed and the water absorption was calculated using the following formula:

$$\text{Water\ abs.\ (\%)} = \frac{\text{Weight of bars after water treatment (g)} - \text{Weight of bars before water treatment (g)}}{\text{Weight of bars before water treatment (g)}} \times 100\%$$

Reference Binder Compositions from the Prior Art and Reference Binders

Reference Binder, Example A (Phenol-Formaldehyde Resin Modified with Urea, a PUF-Resol)

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction. To measure the AT, a titrant is produced from diluting 2.5 mL conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 mL) and ammonium sulfate (13.2 g) followed by water (1.30 kg). The binder solids were then measured as described above and the mixture was diluted with the required amount of water and silane (Momentive VS-142) for mechanical strength studies (15% binder solids solution, 0.5% silane of binder solids).

Reference Binder, Example B

A mixture of 75% aq. glucose syrup (38.9 g), ammonium sulfamate (1.17 g), 50% hypophosphorous acid (0.58 g) and urea (1.46 g) in water (106.4 g) was stirred at room temperature until a clear solution was obtained. 28% aq. ammonia (0.38 g) was then added dropwise followed by 10% silane Momentive VS-142 silane (1.13 g). The final binder mixture was 15% in binder solids and had pH 8.

Reference Binder, Example F

To 1M NaOH (31.5 g) stirred at room temperature was added chestnut tree tannin (9.00 g). After stirring at room temperature for 5-10 min further, the resulting deep-brown solution was used in the subsequent experiments.

A mixture of IMAGEL® LA gelatin (12.00 g) in water (68.54 g) was stirred at 50° C. for approx. 15-30 min until a clear solution was obtained (pH 4.7). 1M NaOH (3.90 g) was then added (pH 9.0) followed by a portion of the above chestnut tree tannin solution (5.40 g; thus efficiently 1.20 g chestnut tree tannin). After stirring for 1-2 minutes further at 50° C., the resulting brown mixture (pH 9.2) was used in the subsequent experiments.

Binder Compositions According to the Present Invention

Binder Example, Example 8

To a stirred solution of NaOH (4.00 g, 0.10 mol) in water (200 mL) at room temperature was added Ca(OH)$_2$ (3.70 g, 0.05 mmol). After stirring at room temperature for 5-10 min further, the resulting colorless suspension was used in the subsequent experiments (while kept under continuous stirring).

To a portion of the above Ca(OH)$_2$—NaOH mixture (31.5 g) stirred at room temperature was added chestnut tree tannin (9.00 g). After stirring at room temperature for 5-10 min further, the resulting deep-brown mixture (pH 8.8) was used in the subsequent experiments.

A mixture of IMAGEL® LA gelatin (12.00 g) in water (66.43 g) was stirred at 50° C. for approx. 15-30 min until a clear solution was obtained (pH 4.9). A portion of the above Ca(OH)$_2$—NaOH mixture (4.78 g) was then added (pH 9.4) followed by a portion of the above chestnut tree tannin mixture (2.70 g; thus efficiently 0.60 g chestnut tree tannin). After stirring for 1-2 minutes further at 50° C., the resulting brown mixture (pH 9.1) was used in the subsequent experiments.

Binder Example, Example 14

To a stirred solution of NaOH (2.00 g, 0.05 mol) in water (200 mL) at room temperature was added Ca(OH)$_2$ (5.56 g, 0.075 mmol). After stirring at room temperature for 5-10 min further, the resulting colorless suspension was used in the subsequent experiments (while kept under continuous stirring).

To a portion of the above Ca(OH)$_2$—NaOH mixture (31.5 g) stirred at room temperature was added chestnut tree tannin (9.00 g). After stirring at room temperature for 5-10 min further, the resulting deep-brown mixture (pH 8.4) was used in the subsequent experiments.

A mixture of IMAGEL® LA gelatin (12.00 g) in water (68.00 g) was stirred at 50° C. for approx. 15-30 min until a clear solution was obtained (pH 5.2). A portion of the above Ca(OH)$_2$—NaOH mixture (5.19 g) was then added (pH 9.6) followed by a portion of the above chestnut tree tannin mixture (5.40 g; thus efficiently 1.20 g chestnut tree tannin). After stirring for 1-2 minutes further at 50° C., the resulting brown mixture (pH 9.0) was used in the subsequent experiments.

Binder Example, Example 17

To water (200 mL) stirred at room temperature was added Ca(OH)$_2$ (7.41 g, 0.10 mmol). After stirring at room temperature for 5-10 min further, the resulting colorless suspension was used in the subsequent experiments (while kept under continuous stirring).

To a portion of the above Ca(OH)$_2$ mixture (31.5 g) stirred at room temperature was added chestnut tree tannin (9.00 g). After stirring at room temperature for 5-10 min further, the resulting deep-brown mixture (pH 8.0) was used in the subsequent experiments.

A mixture of IMAGEL® LA gelatin (12.00 g) in water (65.42 g) was stirred at 50° C. for approx. 15-30 min until a clear solution was obtained (pH 5.0). A portion of the above Ca(OH)$_2$ mixture (5.13 g) was then added (pH 9.5) followed by a portion of the above chestnut tree tannin mixture (1.62 g; thus efficiently 0.36 g chestnut tree tannin). After stirring for 1-2 minutes further at 50° C., the resulting brown mixture (pH 9.2) was used in the subsequent experiments.

Binder Example, Example 20

To water (200 mL) stirred at room temperature was added Ca(OH)$_2$ (7.41 g, 0.10 mmol). After stirring at room temperature for 5-10 min further, the resulting colorless suspension was used in the subsequent experiments (while kept under continuous stirring).

To a portion of the above Ca(OH)$_2$ mixture (31.5 g) stirred at room temperature was added chestnut tree tannin (9.00 g). After stirring at room temperature for 5-10 min further, the resulting deep-brown mixture (pH 8.0) was used in the subsequent experiments.

A mixture of IMAGEL® LA gelatin (11.00 g) in water (62.83 g) was stirred at 50° C. for approx. 15-30 min until a clear solution was obtained (pH 5.1). A portion of the above Ca(OH)$_2$ mixture (8.21 g) was then added (pH 11.1) followed by a portion of the above chestnut tree tannin mixture (9.90 g; thus efficiently 2.20 g chestnut tree tannin).

After stirring for 1-2 minutes further at 50° C., the resulting brown mixture (pH 9.0) was used in the subsequent experiments.

Binder Example, Example 22

To a stirred solution of NaOH (2.00 g, 0.05 mol) in water (200 mL) at room temperature was added $Ca(OH)_2$ (5.56 g, 0.075 mmol). After stirring at room temperature for 5-10 min further, the resulting colorless suspension was used in the subsequent experiments (while kept under continuous stirring).

To a portion of the above $Ca(OH)_2$—NaOH mixture (31.5 g) stirred at room temperature was added chestnut tree tannin (9.00 g). After stirring at room temperature for 5-10 min further, the resulting deep-brown mixture (pH 8.4) was used in the subsequent experiments.

A mixture of IMAGEL® LA gelatin (7.50 g) and sericin (2.50 g) in water (56.23 g) was stirred at 50° C. for approx. 15-30 min until a clear solution was obtained (pH 5.6). A portion of the above $Ca(OH)_2$—NaOH mixture (4.55 g) was then added (pH 9.3) followed by a portion of the above chestnut tree tannin mixture (5.40 g; thus efficiently 1.20 g chestnut tree tannin). After stirring for 1-2 minutes further at 50° C., the resulting brown mixture (pH 9.1) was used in the subsequent experiments.

Binder Example, Example 23

To a stirred solution of NaOH (2.00 g, 0.05 mol) in water (200 mL) at room temperature was added $Ba(OH)_2$ (12.85 g, 0.075 mmol). After stirring at room temperature for 5-10 min further, the resulting colorless suspension was used in the subsequent experiments (while kept under continuous stirring).

To a portion of the above $Ba(OH)_2$—NaOH mixture (31.5 g) stirred at room temperature was added chestnut tree tannin (9.00 g). After stirring at room temperature for 5-10 min further, the resulting brown mixture (pH 8.6) was used in the subsequent experiments.

A mixture of IMAGEL® LA gelatin (12.00 g) in water (70.19 g) was stirred at 50° C. for approx. 15-30 min until a clear solution was obtained (pH 4.9). A portion of the above $Ba(OH)_2$—NaOH mixture (4.77 g) was then added (pH 9.2) followed by a portion of the above chestnut tree tannin mixture (5.40 g; thus efficiently 1.20 g chestnut tannin). After stirring for 1-2 minutes further at 50° C., the resulting brown mixture (pH 9.0) was used in the subsequent experiments.

Binder Example, Example 25

To a stirred solution of NaOH (1.00 g, 0.025 mol) in water (200 mL) at room temperature was added $Ca(OH)_2$ (2.79 g, 0.038 mmol). After stirring at room temperature for 5-10 min further, the resulting colorless suspension was used in the subsequent experiments (while kept under continuous stirring).

To a portion of the above $Ca(OH)_2$—NaOH mixture (31.5 g) stirred at room temperature was added quebracho tannin (9.00 g). After stirring at room temperature for 5-10 min further, the resulting brown mixture (pH 8.8) was used in the subsequent experiments.

A mixture of IMAGEL® LA gelatin (12.00 g) in water (63.47 g) was stirred at 50° C. for approx. 15-30 min until a clear solution was obtained (pH 4.9). A portion of the above $Ca(H)_2$—NaOH mixture (8.68 g) was then added (pH 9.2) followed by a portion of the above chestnut tree tannin mixture (5.40 g; thus efficiently 1.20 g quebracho tannin). After stirring for 1-2 minutes further at 50° C., the resulting brown mixture (pH 9.0) was used in the subsequent experiments.

TABLE 1-1

Binder compositions according to the prior art

| Example | A | B |
|---|---|---|
| Binder properties | | |
| Binder solids (%) | 15.0 | 15.0 |
| Reaction loss (%) | 28.5 | 30.3 |
| pH | 9.6 | 8 |
| Bar curing conditions | | |
| Temperature (° C./1 h) | 200 | 225 |
| Bar properties | | |
| Mechanical strength, unaged (kN) | 0.52 | 0.37 |
| Mechanical strength, water bath aged (kN) | 0.35 | 0.29 |
| LOI, unaged (%) | 2.6 | 2.4 |
| LOI, water aged (%) | 2.6 | 2.4 |
| Water absorption, 3 h (%) | 21 | 23 |
| Water absorption, 24 h (%) | 21 | 24 |

TABLE 1-2

Reference binders (protein, crosslinker, sodium hydroxide)

| Example | C | D | E | F | G |
|---|---|---|---|---|---|
| Binder composition | | | | | |
| Protein (%-wt.) [a] | | | | | |
| IMAGEL® LA gelatin | 100 | 100 | 100 | 100 | 100 |
| IMAGEL® LB gelatin | — | — | — | — | — |
| Sericin | — | — | — | — | — |
| Crosslinker (%-wt.) [a] | | | | | |
| Chestnut tree tannin | — | 3 | 5 | 10 | 20 |
| Quebracho tannin | — | — | — | — | — |
| Monovalent metal cation compound (%-wt.) [b] | | | | | |
| Sodium hydroxide | 1.2 | 1.6 | 1.8 | 2.4 | 3.3 |
| Divalent metal cation compound (%-wt.) [b] | | | | | |
| Calcium hydroxide | — | — | — | — | — |
| Barium hydroxide | — | — | — | — | — |
| Magnesium hydroxide | — | — | — | — | — |
| Monovalent and divalent metal cations (molar ratios) | | | | | |
| Sodium | 100 | 100 | 100 | 100 | 100 |
| Calcium | 0 | 0 | 0 | 0 | 0 |
| Barium | 0 | 0 | 0 | 0 | 0 |
| Magnesium | 0 | 0 | 0 | 0 | 0 |
| Binder mixing and bar manufacture | | | | | |
| Binder component solids content (%) | 15.0 | 15.0 | 15.0 | 15.0 | 15.0 |
| pH of binder mixture | 9.1 | 9.0 | 9.0 | 9.2 | 9.2 |
| Curing temperature (° C.) | rt | rt | rt | rt | rt |
| Bar properties | | | | | |
| Mechanical strength, unaged (kN) | 0.32 | 0.34 | 0.32 | 0.31 | 0.25 |

TABLE 1-2-continued

Reference binders (protein, crosslinker, sodium hydroxide)

| Example | C | D | E | F | G |
|---|---|---|---|---|---|
| Mechanical strength, water bath aged (kN) | 0 | 0.28 | 0.29 | 0.27 | 0.26 |
| Mechanical strength, autoclave aged (kN) | 0.25 | 0.24 | 0.23 | 0.19 | 0.19 |
| LOI, unaged (%) | 2.5 | 2.5 | 2.5 | 2.5 | 2.5 |
| LOI, water bath aged (%) | 0 | 2.2 | 2.3 | 2.3 | 2.3 |
| LOI, autoclave aged (%) | 2.5 | 2.5 | 2.5 | 2.5 | 2.4 |
| Water absorption, 3 h (%) | 5 | 8 | 7 | 8 | 11 |
| Water absorption, 24 h (%) | 12 | 18 | 17 | 19 | 25 |

[a] Of protein.
[b] Of protein + crosslinker.

TABLE 1-3

Reference binders (protein, crosslinker, sodium hydroxide)

| Example | H | I | J | K | L |
|---|---|---|---|---|---|
| Binder composition | | | | | |
| Protein (%-wt.) [a] | | | | | |
| IMAGEL ® LA gelatin | 100 | 100 | — | 75 | 100 |
| IMAGEL ® LB gelatin | — | — | 100 | — | — |
| Sericin | — | — | — | 25 | — |
| Crosslinker (%-wt.) [a] | | | | | |
| Chestnut tree tannin | 30 | 50 | 10 | 12 | — |
| Quebracho tannin | — | — | — | — | 10 |
| Monovalent metal cation compound (%-wt.) [b] | | | | | |
| Sodium hydroxide | 4.1 | 5.3 | 2.5 | 2.4 | 1.7 |
| Divalent metal cation compound (%-wt.) [b] | | | | | |
| Calcium hydroxide | — | — | — | — | — |
| Barium hydroxide | — | — | — | — | — |
| Magnesium hydroxide | — | — | — | — | — |
| Monovalent and divalent metal cations (molar ratios) | | | | | |
| Sodium | 100 | 100 | 100 | 100 | 100 |
| Calcium | 0 | 0 | 0 | 0 | 0 |
| Barium | 0 | 0 | 0 | 0 | 0 |
| Magnesium | 0 | 0 | 0 | 0 | 0 |
| Binder mixing and bar manufacture | | | | | |
| Binder component solids content (%) | 15.0 | 15.0 | 15.0 | 15.0 | 15.0 |
| pH of binder mixture | 9.2 | 9.1 | 9.2 | 9.1 | 9.0 |
| Curing temperature (° C.) | rt | rt | rt | rt | rt |
| Bar properties | | | | | |
| Mechanical strength, unaged (kN) | 0.16 | 0.10 | 0.34 | 0.26 | 0.33 |
| Mechanical strength, water bath aged (kN) | 0.17 | 0.10 | 0.22 | 0.22 | 0.26 |
| Mechanical strength, autoclave aged (kN) | 0.12 | 0.08 | 0.23 | — | 0.25 |
| LOI, unaged (%) | 2.4 | 2.4 | 2.5 | 2.6 | 2.5 |
| LOI, water bath aged (%) | 2.2 | 2.1 | 2.4 | 2.3 | 2.4 |
| LOI, autoclave aged (%) | 2.4 | 2.3 | 2.5 | — | 2.5 |
| Water absorption, 3 h (%) | 13 | 15 | 16 | 14 | 6 |
| Water absorption, 24 h (%) | 29 | 33 | 38 | 34 | 16 |

[a] Of protein.
[b] Of protein + crosslinker.

TABLE 1-4

Protein, crosslinker, calcium hydroxide-sodium hydroxide

| Example | 1 | 2 | 3 | 4 | 5 |
|---|---|---|---|---|---|
| Binder composition | | | | | |
| Protein (%-wt.) [a] | | | | | |
| IMAGEL ® LA gelatin | 100 | 100 | 100 | 100 | 100 |
| IMAGEL ® LB gelatin | — | — | — | — | — |
| Sericin | — | — | — | — | — |
| Crosslinker (%-wt.) [a] | | | | | |
| Chestnut tree tannin | — | 3 | 5 | 10 | 20 |
| Quebracho tannin | — | — | — | — | — |
| Monovalent metal cation compound (%-wt.) [b] | | | | | |
| Sodium hydroxide | 1.2 | 1.7 | 2.0 | 2.5 | 3.3 |
| Divalent metal cation compound (%-wt.) [b] | | | | | |
| Calcium hydroxide | 0.4 | 0.5 | 0.6 | 0.8 | 1.0 |
| Barium hydroxide | — | — | — | — | — |
| Magnesium hydroxide | — | — | — | — | — |
| Monovalent and divalent metal cations (molar ratios) | | | | | |
| Sodium | 85.7 | 85.7 | 85.7 | 85.7 | 85.7 |
| Calcium | 14.3 | 14.3 | 14.3 | 14.3 | 14.3 |
| Barium | — | — | — | — | — |
| Magnesium | — | — | — | — | — |
| Binder mixing and bar manufacture | | | | | |
| Binder component solids content (%) | 15.0 | 15.0 | 15.0 | 15.0 | 15.0 |
| pH of binder mixture | 9.0 | 9.0 | 9.1 | 9.1 | 9.0 |
| Curing temperature (° C.) | rt | rt | rt | rt | rt |
| Bar properties | | | | | |
| Mechanical strength, unaged (kN) | 0.29 | 0.32 | 0.32 | 0.29 | 0.20 |
| Mechanical strength, water bath aged (kN) | 0 | 0.23 | 0.29 | 0.31 | 0.24 |
| Mechanical strength, autoclave aged (kN) | 0.25 | 0.20 | 0.18 | 0.18 | 0.12 |
| LOI, unaged (%) | 2.5 | 2.5 | 2.5 | 2.5 | 2.4 |
| LOI, water bath aged (%) | 0 | 2.0 | 2.2 | 2.3 | 2.3 |
| LOI, autoclave aged (%) | 2.5 | 2.5 | 2.5 | 2.4 | 2.4 |
| Water absorption, 3 h (%) | 5 | 7 | 7 | 8 | 10 |
| Water absorption, 24 h (%) | 12 | 18 | 18 | 20 | 24 |

[a] Of protein.
[b] Of protein + crosslinker.

TABLE 1-5

Protein, crosslinker, calcium hydroxide-sodium hydroxide

| Example | 6 | 7 | 8 | 9 | 10 |
|---|---|---|---|---|---|
| Binder composition | | | | | |
| Protein (%-wt.) [a] | | | | | |
| IMAGEL ® LA gelatin | 100 | 100 | 100 | 100 | 100 |
| IMAGEL ® LB gelatin | — | — | — | — | — |
| Sericin | — | — | — | — | — |
| Crosslinker (%-wt.) [a] | | | | | |
| Chestnut tree tannin | — | 3 | 5 | 10 | 20 |
| Quebracho tannin | — | — | — | — | — |
| Monovalent metal cation compound (%-wt.) [b] | | | | | |
| Sodium hydroxide | 0.6 | 0.9 | 1.1 | 1.3 | 1.8 |

TABLE 1-5-continued

Protein, crosslinker, calcium hydroxide-sodium hydroxide

| Example | 6 | 7 | 8 | 9 | 10 |
|---|---|---|---|---|---|
| Divalent metal cation compound (%-wt.) [b] | | | | | |
| Calcium hydroxide | 0.5 | 0.8 | 1.0 | 1.2 | 1.7 |
| Barium hydroxide | — | — | — | — | — |
| Magnesium hydroxide | — | — | — | — | — |
| Monovalent and divalent metal cations (molar ratios) | | | | | |
| Sodium | 66.7 | 66.7 | 66.7 | 66.7 | 66.7 |
| Calcium | 33.3 | 33.3 | 33.3 | 33.3 | 33.3 |
| Barium | — | — | — | — | — |
| Magnesium | — | — | — | — | — |
| Binder mixing and bar manufacture | | | | | |
| Binder component solids content (%) | 15.0 | 15.0 | 15.0 | 15.0 | 15.0 |
| pH of binder mixture | 9.0 | 9.0 | 9.1 | 9.1 | 9.0 |
| Curing temperature (° C.) | rt | rt | rt | rt | rt |
| Bar properties | | | | | |
| Mechanical strength, unaged (kN) | 0.31 | 0.35 | 0.36 | 0.32 | 0.32 |
| Mechanical strength, water bath aged (kN) | 0 | 0.03 | 0.21 | 0.26 | 0.29 |
| Mechanical strength, autoclave aged (kN) | 0.33 | 0.30 | 0.27 | 0.25 | 0.23 |
| LOI, unaged (%) | 2.6 | 2.6 | 2.5 | 2.5 | 2.5 |
| LOI, water bath aged (%) | 0 | 0.8 | 2.0 | 2.2 | 2.3 |
| LOI, autoclave aged (%) | 2.5 | 2.5 | 2.5 | 2.5 | 2.5 |
| Water absorption, 3 h (%) | 5 | 5 | 5 | 6 | 7 |
| Water absorption, 24 h (%) | 10 | 11 | 13 | 15 | 17 |

[a] Of protein.
[b] Of protein + crosslinker.

TABLE 1-6

Protein, crosslinker, calcium hydroxide-sodium hydroxide

| Example | 11 | 12 | 13 | 14 | 15 |
|---|---|---|---|---|---|
| Binder composition Protein (%-wt.) [a] | | | | | |
| IMAGEL ® LA gelatin | 100 | 100 | 100 | 100 | 100 |
| IMAGEL ® LB gelatin | — | — | — | — | — |
| Sericin | — | — | — | — | — |
| Crosslinker (%-wt.) [a] | | | | | |
| Chestnut tree tannin | — | 3 | 5 | 10 | 20 |
| Quebracho tannin | — | — | — | — | — |
| Monovalent metal cation compound (%-wt.) [b] | | | | | |
| Sodium hydroxide | 0.3 | 0.4 | 0.5 | 0.7 | 1.0 |
| Divalent metal cation compound (%-wt.) [b] | | | | | |
| Calcium hydroxide | 0.9 | 1.2 | 1.4 | 1.9 | 2.8 |
| Barium hydroxide | — | — | — | — | — |
| Magnesium hydroxide | — | — | — | — | — |
| Monovalent and divalent metal cations (molar ratios) | | | | | |
| Sodium | 40 | 40 | 40 | 40 | 40 |
| Calcium | 60 | 60 | 60 | 60 | 60 |
| Barium | — | — | — | — | — |
| Magnesium | — | — | — | — | — |
| Binder mixing and bar manufacture | | | | | |
| Binder component solids content (%) | 15.0 | 15.0 | 15.0 | 14.9 | 15.0 |
| pH of binder mixture | 9.1 | 9.1 | 9.0 | 9.0 | 9.1 |
| Curing temperature (° C.) | rt | rt | rt | rt | rt |
| Bar properties | | | | | |
| Mechanical strength, unaged (kN) | 0.31 | 0.34 | 0.34 | 0.32 | 0.27 |
| Mechanical strength, water bath aged (kN) | 0 | 0 | 0.16 | 0.26 | 0.29 |
| Mechanical strength, autoclave aged (kN) | 0.27 | 0.28 | 0.29 | 0.23 | 0.18 |
| LOI, unaged (%) | 2.5 | 2.5 | 2.5 | 2.5 | 2.4 |
| LOI, water bath aged (%) | 0 | 0 | 1.6 | 2.1 | 2.2 |
| LOI, autoclave aged (%) | 2.5 | 2.4 | 2.4 | 2.4 | 2.4 |
| Water absorption, 3 h (%) | 4 | 4 | 4 | 4 | 5 |
| Water absorption, 24 h (%) | 9 | 9 | 10 | 10 | 11 |

[a] Of protein.
[b] Of protein + crosslinker.

TABLE 1-7

Protein, crosslinker, calcium hydroxide

| Example | 16 | 17 | 18 | 19 | 20 |
|---|---|---|---|---|---|
| Binder composition Protein (%-wt.) [a] | | | | | |
| IMAGEL ® LA gelatin | 100 | 100 | 100 | 100 | 100 |
| IMAGEL ® LB gelatin | — | — | — | — | — |
| Sericin | — | — | — | — | — |
| Crosslinker (%-wt.) [a] | | | | | |
| Chestnut tree tannin | — | 3 | 5 | 10 | 20 |
| Quebracho tannin | — | — | — | — | — |
| Monovalent metal cation compound (%-wt.) [b] | | | | | |
| Sodium hydroxide | 0 | 0 | 0 | 0 | 0 |
| Divalent metal cation compound (%-wt.) [b] | | | | | |
| Calcium hydroxide | 1.2 | 1.8 | 2.0 | 2.8 | 4.3 |
| Barium hydroxide | — | — | — | — | — |
| Magnesium hydroxide | — | — | — | — | — |
| Monovalent and divalent metal cations (molar ratios) | | | | | |
| Sodium | 0 | 0 | 0 | 0 | 0 |
| Calcium | 100 | 100 | 100 | 100 | 100 |
| Barium | — | — | — | — | — |
| Magnesium | — | — | — | — | — |
| Binder mixing and bar manufacture | | | | | |
| Binder component solids content (%) | 15.0 | 15.0 | 15.0 | 15.0 | 15.0 |
| pH of binder mixture | 9.0 | 9.2 | 9.0 | 9.0 | 9.0 |
| Curing temperature (° C.) | rt | rt | rt | rt | rt |
| Bar properties | | | | | |
| Mechanical strength, unaged (kN) | 0.34 | 0.37 | 0.37 | 0.36 | 0.33 |
| Mechanical strength, water bath aged (kN) | 0 | 0 | 0 | 0.27 | 0.29 |
| Mechanical strength, autoclave aged (kN) | 0.36 | 0.34 | 0.26 | 0.23 | 0.16 |

TABLE 1-7-continued

Protein, crosslinker, calcium hydroxide

| Example | 16 | 17 | 18 | 19 | 20 |
|---|---|---|---|---|---|
| LOI, unaged (%) | 2.7 | 2.6 | 2.5 | 2.5 | 2.5 |
| LOI, water bath aged (%) | 0 | 0 | 0 | 2.0 | 2.2 |
| LOI, autoclave aged (%) | 2.6 | 2.5 | 2.5 | 2.5 | 2.4 |
| Water absorption, 3 h (%) | 4 | 4 | 4 | 4 | 4 |
| Water absorption, 24 h (%) | 9 | 8 | 8 | 9 | 9 |

[a] Of protein.
[b] Of protein + crosslinker.

TABLE 1-8

Protein, crosslinker, $M^{2+}$ hydroxide-sodium hydroxide

| Example | 21 | 22 | 23 | 24 | 25 |
|---|---|---|---|---|---|
| Binder composition | | | | | |
| Protein (%-wt.) [a] | | | | | |
| IMAGEL ® LA gelatin | — | 75 | 100 | 100 | 100 |
| IMAGEL ® LB gelatin | 100 | — | — | — | — |
| Sericin | — | 25 | — | — | — |
| Crosslinker (%-wt.) [a] | | | | | |
| Chestnut tree tannin | 10 | 12 | 10 | 10 | — |
| Quebracho tannin | — | — | — | — | 10 |
| Monovalent metal cation compound (%-wt.) [b] | | | | | |
| Sodium hydroxide | 0.7 | 0.8 | 0.6 | 2.0 | 0.5 |
| Divalent metal cation compound (%-wt.) [b] | | | | | |
| Calcium hydroxide | 2.1 | 2.1 | — | — | 1.3 |
| Barium hydroxide | — | — | 4.1 | — | — |
| Magnesium hydroxide | — | — | — | 4.3 | — |
| Monovalent and divalent metal cations (molar ratios) | | | | | |
| Sodium | 40 | 40 | 40 | 40 | 40 |
| Calcium | 60 | 60 | 0 | 0 | 60 |
| Barium | 0 | 0 | 60 | 0 | 0 |
| Magnesium | 0 | 0 | 0 | 60 | 0 |
| Binder mixing and bar manufacture | | | | | |
| Binder component solids content (%) | 15.0 | 15.1 | 15.0 | 14.7 | 15.0 |
| pH of binder mixture• | 9.0 | 9.1 | 9.0 | 9.0 | 9.0 |
| Curing temperature (° C.) | rt | rt | rt | rt | rt |
| Bar properties | | | | | |
| Mechanical strength, unaged (kN) | 0.39 | 0.27 | 0.35 | 0.31 | 0.31 |
| Mechanical strength, water bath aged (kN) | 0.15 | 0.18 | 0.26 | 0.28 | 0.25 |
| Mechanical strength, autoclave aged (kN) | 0.28 | — | 0.25 | 0.20 | 0.25 |
| LOI, unaged (%) | 2.6 | 2.6 | 2.5 | 2.4 | 2.5 |
| LOI, water bath aged (%) | 2.1 | 2.0 | 2.3 | 2.3 | 2.4 |
| LOI, autoclave aged (%) | 2.5 | — | 2.4 | 2.4 | 2.5 |
| Water absorption, 3 h (%) | 10 | 8 | 7 | 7 | 4 |
| Water absorption, 24 h (%) | 25 | 20 | 15 | 17 | 10 |

[a] Of protein.
[b] Of protein + crosslinker.

The results of the experimental work described above are summarized in Fiq. 1, which shows: Unaged (A), autoclave aged (B) and water bath aged (C) mechanical strengths of composite bars made from stone shots and IMAGEL® LA modified with chestnut tree tannin in the presence of Ca(OH)$_2$ (■, solid line), Ca:Na 60:40 (●, long dash line), Ca:Na 33:67 (▲, dash line), Ca:Na 14:86 (♦, short dash line) and NaOH (x, dotted line). The degree of binder solubility calculated as loss in binder content resulting from water bath ageing (D) as well as the water uptake of the composite bars measured after 3 h (D) and 24 h (E) in water.

The invention claimed is:

1. A binder composition for mineral fibers, wherein the composition is formaldehyde-free and comprises:
   (a) at least one phenol containing compound,
   (b) at least one protein, and
   (c) at least one compound which contains a divalent metal cation $M^{2+}$,
   (c) being present in a concentration of from 0.1 wt. % to 10 wt. %, based on a combined dry weight of (a) and (b).

2. The binder composition of claim 1, wherein (c) comprises one or more divalent metal cations $M^{2+}$ selected from divalent cations of alkaline earth metals, and divalent cations of Mn, Fe, Cu, Zn, Sn.

3. The binder composition of claim 2, wherein (c) comprises one or more of $M(OH)_2$, MO, $M(HCO_3)_2$, $MCO_3$, $M(H_2PO_4)_2$, $MHPO_4$, $M_3(PO_4)_2$, $M(HPO_3)$, $M(H_2PO_2)_2$, $MSO_4$, $MCl_2$, $MHNSO_3$.

4. The binder composition of claim 1, wherein (c) comprises $Ca^{2+}$.

5. The binder composition of claim 1, wherein the composition comprises from 1.0 wt. % to 4.3 wt. % of (c), based on a combined dry weight of (a) and (b).

6. The binder composition of claim 1, wherein the composition further comprises one or more monovalent metal cations of Li, Na, K.

7. The binder composition of claim 1, wherein the composition further comprises from 0.01 wt. % to 6 wt. % of at least one monovalent metal cation $M^+$ containing compound, based on a combined dry weight of (a) and (b).

8. The binder composition of claim 7, wherein a molar ratio of one or more divalent metal cations $M^{2+}$ and one or more monovalent metal cations $M^+$ is from 10:90 to 90:10.

9. The binder composition of claim 1, wherein (b) comprises one or more proteins derived from animal sources.

10. The binder composition of claim 1, wherein (b) comprises one or more proteins derived from plant sources.

11. The binder composition of claim 1, wherein the composition comprises from 1 wt. % to 60 wt. % of (a), based on dry protein basis.

12. The binder composition of claim 1, wherein (b) comprises from 50 to 400 (hydroxyproline+proline) residues per 1000 amino acid residues.

13. The binder composition of claim 1, wherein the binder composition further comprises an oxidant.

14. The binder composition of claim 13, wherein the oxidant comprises tyrosinase.

15. The binder composition of claim 1, wherein the binder composition has a pH of higher than 7.

16. The binder composition of claim 1, wherein the binder composition has a pH of higher than 9.

17. A mineral wool product, wherein the product comprises fibers bonded by the binder composition of claim 1 in cured form.

18. A method of producing a mineral wool product, wherein the method comprises contacting mineral fibers with the binder composition of claim 1 and thereafter curing the binder composition.

19. A method of improving the water uptake and/or the mechanical properties and/or the aging properties of a mineral wool product comprising mineral fibers bonded by a cured formaldehyde-free binder composition which comprises (a) at least one phenol containing compound and (b) at least one protein, wherein the method comprises including in the uncured binder composition (c) one or more compounds which contain a divalent metal cation $M^{2+}$ in an amount which results in a concentration of (c) of from 0.1 wt. % to 10 wt. %, based on a combined dry weight of (a) and (b).

20. The binder composition of claim 1, wherein (c) comprises one or more alkaline earth metal cations $M^{2+}$.

\* \* \* \* \*